United States Patent
Harpin et al.

(10) Patent No.: US 9,989,385 B2
(45) Date of Patent: *Jun. 5, 2018

(54) METHOD OF ASSEMBLING AN OPTICAL SENSOR

(71) Applicant: Oxsensis Limited, Chilton, Didcot (GB)

(72) Inventors: Arnold Peter Roscoe Harpin, Oxford (GB); Stephen James Fasham, Swindon (GB); Stephen Geoffrey Tyler, Oxon (GB)

(73) Assignee: Oxsensis Limited, Didcot (GB)

(*) Notice: Subject to any disclaimer, the term of this patent is extended or adjusted under 35 U.S.C. 154(b) by 0 days. days.

This patent is subject to a terminal disclaimer.

(21) Appl. No.: 15/243,492

(22) Filed: Aug. 22, 2016

(65) Prior Publication Data

US 2017/0045384 A1    Feb. 16, 2017

Related U.S. Application Data

(62) Division of application No. 14/239,386, filed as application No. PCT/GB2012/051932 on Aug. 9, 2012, now Pat. No. 9,448,105.

(30) Foreign Application Priority Data

Aug. 18, 2011 (GB) .................................. 1114276.7

(51) Int. Cl.
*G02B 6/00* (2006.01)
*G01D 11/24* (2006.01)
(Continued)

(52) U.S. Cl.
CPC ........... *G01D 11/245* (2013.01); *G01D 5/268* (2013.01); *G01D 5/35312* (2013.01);
(Continued)

(58) Field of Classification Search
CPC ..... G01L 1/246; G01L 1/242; G01N 21/7703; G02B 6/00; G01K 11/32
See application file for complete search history.

(56) References Cited

U.S. PATENT DOCUMENTS

| 4,428,239 A | 1/1984 | Johnston |
| 4,933,545 A | 6/1990 | Saaski et al. |

(Continued)

FOREIGN PATENT DOCUMENTS

| EP | 0 196 784 A2 | 10/1986 |
| EP | 2 072 986 A1 | 6/2009 |

(Continued)

OTHER PUBLICATIONS

International Search Report and Written Opinion dated Jan. 20, 2014 in connection with corresponding International Application No. PCT/GB2012/051932.

(Continued)

*Primary Examiner* — Jennifer Doan
(74) *Attorney, Agent, or Firm* — Wolf, Greenfield & Sacks, P.C.

(57) ABSTRACT

A method of assembling an optical sensor for measuring pressure and/or temperature is disclosed. The optical sensor is adapted for use in high temperature environments, such as gas turbines and other engines. The method comprises fabricating a sensor element formed of a pill having an enclosed cavity, bonding the pill to a front end of a spacer, bonding a lens to the back end of the spacer to form the optical assembly, aligning an optical fiber to the optical assembly, and fixing the fiber in position by fusing the fiber to the lens.

14 Claims, 10 Drawing Sheets

(51) Int. Cl.

| | |
|---|---|
| *G01L 9/00* | (2006.01) |
| *G01L 19/04* | (2006.01) |
| *G01D 5/353* | (2006.01) |
| *G01K 11/32* | (2006.01) |
| *G01J 1/04* | (2006.01) |
| *G01L 11/02* | (2006.01) |
| *G01D 5/26* | (2006.01) |
| *G02B 6/32* | (2006.01) |
| *G02B 6/42* | (2006.01) |

(52) U.S. Cl.
CPC ............ *G01J 1/0425* (2013.01); *G01K 11/32* (2013.01); *G01K 11/3206* (2013.01); *G01L 9/0079* (2013.01); *G01L 11/025* (2013.01); *G01L 19/04* (2013.01); *G02B 6/32* (2013.01); *G02B 6/424* (2013.01); *G02B 6/4239* (2013.01); *Y10T 156/10* (2015.01)

(56) References Cited

U.S. PATENT DOCUMENTS

| | | | | |
|---|---|---|---|---|
| 5,161,207 | A * | 11/1992 | Pikulski | B23K 26/0734 219/121.63 |
| 7,832,276 | B2 | 11/2010 | Wu et al. | |
| 8,705,045 | B2 * | 4/2014 | Harpin | G01K 11/3206 356/477 |
| 9,448,105 | B2 | 9/2016 | Harpin et al. | |
| 2003/0118802 | A1 | 6/2003 | Bjoerkman | |
| 2004/0012942 | A1 | 1/2004 | Bjoerkman et al. | |
| 2005/0152644 | A1 * | 7/2005 | Barefoot | G02B 6/262 385/33 |
| 2007/0089524 | A1 | 4/2007 | Walchli et al. | |
| 2010/0122583 | A1 | 5/2010 | Rozgo et al. | |
| 2014/0202253 | A1 | 7/2014 | Harpin et al. | |

FOREIGN PATENT DOCUMENTS

| | | |
|---|---|---|
| WO | WO 2005/024365 A2 | 3/2005 |
| WO | WO 2005/098385 A1 | 10/2005 |
| WO | WO 2007/149733 A2 | 12/2007 |
| WO | WO 2009/077727 A2 | 6/2009 |

OTHER PUBLICATIONS

United Kingdom Search Report dated Dec. 9, 2011 in connection with corresponding United Kingdom Application No. GB1114276.7.

United Kingdom Search Report dated Apr. 28, 2016 in connection with corresponding United Kingdom Application No. GB1114276.7.

United Kingdom Search Report dated Sep. 26, 2016 in connection with corresponding United Kingdom Application No. GB111276.7.

United Kingdom Examination Report dated Sep. 29, 2016 in connection with corresponding United Kingdom Application No. GB111276.7.

United Kingdom Combined Search and Examination Report dated Feb. 9, 2017 in connection with Application No. GB 1701358.2.

* cited by examiner

METHOD OF ASSEMBLING AN OPTICAL SENSOR

RELATED APPLICATIONS

This application is a divisional of and claims priority under 35 U.S.C. § 121 to U.S. patent application Ser. No. 14/239,386, entitled "OPTICAL SENSOR," filed Feb. 18, 2014, which is a U.S. National Phase Application under 35 U.S.C. § 371 of International Application No. PCT/GB2012/051932, entitled "OPTICAL SENSOR," filed Aug. 9, 2012, which claims priority to British Patent Application No. 1114276.7, entitled "OPTICAL SENSOR," filed Aug. 18, 2011. These prior applications are incorporated by reference herein in their entirety.

TECHNICAL FIELD

The present invention relates to an optical sensor and more specifically to an optical sensor for measuring pressure and/or temperature. The optical sensor is adapted for use in high temperature environments, such as gas turbines and other engines.

BACKGROUND ART

WO 2009/077727 describes an optical sensor for monitoring environmental parameters such as temperature and/or pressure in extreme environments. For example, the sensor is adapted for use at the high temperatures inside gas turbines. The sensor comprises a sensor element which includes an enclosed cavity arranged as a Fabry-Perot cavity, and an optical fibre. Conventional silica optical fibres cannot withstand temperatures above 600° C. whereas the temperature inside gas turbines exceeds this and may be up to 1000° C. Indeed conventional materials for the sensor element, such as silicon, are not able to withstand such extreme temperatures.

The device described in WO 2009/077727 addresses these problems by providing a sensor element of sapphire and spacing the optical fibre away from the sensor element such that it is not in the extreme temperature environment. This allows a conventional optical fibre to be used. The device is shown in FIG. 1 and comprises a sensor element 10 formed of dielectric material such as sapphire. The sensor element 10 includes a Fabry-Perot cavity enclosed in the element. The sensor element 10 is bonded to spacer 20 which may be a sapphire tube or rod. A waveguide such as an optical fibre 30 delivers light to the sensor for illuminating the sensor element.

The sensor element 10, spacer 20, and optical fibre 30 are mounted to a housing 40. The housing 40 includes a circular socket 45. The optical fibre is mounted in fibre mount 50 which includes a ball 55. The ball 55 fits into the circular socket 45 of housing 40. A lens 60 is mounted close to, or on the end of the optical fibre, inside the fibre mount. The lens 60 provides a collimated beam which is directed to the sensor element 10. A collimated beam is used because the beam does not significantly diverge over the length of the spacer 20. A cap 70 fits over the spacer 20 and sensor element 10 to protect it from mechanical damage. The cap 70 may include a hole 75 through which gas of the surrounding environment may flow. The hole 75 reduces thermal lag between the environment and the sensor element 20. A protective boot 80 is fitted at the other end of the device to protect the optical fibre.

The sensor element 10 is a dielectric body, sometimes known as a "pill". The pill is shown in detail in FIG. 2 and consists of a disc 12 of sapphire with a small circular recess 14. The disc 12 is bonded to another piece of sapphire 16 which forms a back plate. The disc 12 is thinned to produce a flexible membrane 13 which may flex in response to external pressure. The sapphire surfaces form one or more Fabry-Perot cavities that can be interrogated optically using the collimated light from fibre 30. For example, the distance "A" between the flexible membrane 13 and the back plate 16 provides a cavity which is responsive to changes in pressure. The back plate 16 has front and back surfaces which form a cavity. Thus, the thickness "B" will be responsive to changes in temperature. The cavity "A" will also be responsive to changes in temperature but by interrogating more than one cavity simultaneously the pressure measurement may be corrected for temperature changes. As well as interrogating the cavity "B" of the back plate 16, the thickness "C" of the membrane 13 may be interrogated to provide temperature measurements in front of and behind the pressure cavity to allow accurate interpolation of the temperature of the pressure cavity. This allows the change in cavity size "A" due to pressure to be decoupled from the change in "A" due to temperature.

In an alternative arrangement requiring only pressure measurement, and in which errors due to temperature variation can be tolerated, or in the case of dynamic pressure measurement where only the change is required, the external faces of the pill 10 are angled such that only the surfaces of hollow cavity 14 form a Fabry-Perot cavity. Furthermore, the pill 10 shown in FIG. 2 is interrogated using interferometric techniques also described in WO 2009/077727. These techniques may use phase modulated light. If only the pressure is required then simpler intensity measurements are sufficient. This may be advantageous because the extra cavities may interact with the interconnect to the fibre and can cause higher than expected temperature and vibration sensitivity.

As mentioned above, the prior art device allows the sensor element, or pill, 10 to be held and subjected to extremes of temperature. Alignment of the optical system must be maintained over the working temperature range such that light is stably coupled from fibre 30 to sensor element 10 and back without significant signal variation. The spacer 20 allows the optical fibre 30, which is a conventional silica optical fibre, to be in a region cooler than the sensor element 10.

The spacer 20 is a sapphire rod or tube which fits into housing 40. The housing 40 is made of Kovar® and includes a tube in which the spacer rod or tube 20 is a compression fit. The fibre 30 and lens 60 are mounted in fibre mount 50. The lens 60, which collimates the light leaving the fibre 30, is a compression fit in the fibre mount 50. The ball 55 of the fibre mount is fitted into the socket 45 of housing 40. During assembly the fibre mount 50 is held in a gimbal providing two axes of rotation. The position is adjusted until the fibre and lens are aligned to provide maximum optical throughput to the sensor element 10. In practice this is monitored by sending light along the fibre and adjusting the position of the fibre mount until maximum back reflection from the sensor element is detected in the fibre. A fibre coupler is used to split the back reflected light for monitoring. When the optimum position of the fibre mount is obtained, the ball is fixed to the socket with welds, such as laser welds.

There are problems with the device of WO 2009/077727. At the back end the process of aligning the fibre mount to the housing is time consuming and the alignment may drift during burn-in. The compression fit of the collimating lens 60 in ball 55 causes problems due to holding the silica lens which is a hard material in the Kovar over an extended temperature range without causing drift in the optical alignment. The compression fit also requires high tolerances and assembly is labour intensive.

Furthermore, at the front end the spacer 20 is a compression fit in Kovar tube of housing 40, but this fit does not give a rugged seal that lasts for the life of the sensor. The alignment of the spacer 20, and therefore also the sensor element 10, to the collimated beam drifts due to flexure in the housing 40 and drift of the spacer in the tube. Flexure in the housing is particularly problematic because a small angular deviation in the position of the lens may produce a large lateral displacement of the beam at the sensor element thereby causing a large lateral displacement of the back reflected beam reducing coupling to the fibre. This reduction in signal may reduce the dynamic range of the sensor.

It is an object of the present invention to overcome these problems.

SUMMARY OF THE INVENTION

The present invention provides an optical sensor, comprising: an optical assembly comprising a sensor element, a spacer and a lens arranged along an optical axis, the sensor element distanced from the lens by the spacer; an optical fibre coupled to the optical subassembly for illuminating the sensor element; a housing to provide mechanical protection to the optical assembly, wherein the optical assembly is resiliently mounted in the housing such that the optical assembly is insulated from shock or stress to the housing. The sensor element may include a Fabry-Perot cavity such as a disc of material or pill having an enclosed cavity. Shock or stress to the housing may be mechanical shock such as is caused by impacts or deformation. The resilience may also allow the optical assembly to expand and contract without being subjected to stresses from the housing. The resilience is provided by a compliant mount or resilient mount which includes some elasticity and plasticity. The resilient mount may be provided between the optical assembly, such as the spacer and the housing. The resilient mount decouples mechanical shock to the housing from the optical assembly and also decouples thermal expansion of the optical assembly from that of the housing. In use the sensor may be provided in a gas turbine with the sensor element in a combustion zone and the spacer and optical fibre extending away from the combustion zone.

The sensor element may be adapted for use at a first temperature, the lens and optical fibre are configured for use up to a second temperature lower than the first temperature. The sensor element may be provided at distance from the lens and fibre by the spacer so as to provide a thermal gradient from the sensor element to the lens and fibre when in use. The thermal gradient results in the lens and fibre not experiencing the full temperature in a combustion zone. This permits the use of silica for the lens and fibre, as opposed to sapphire for the sensor element and spacer which can withstand the higher temperatures of the combustion zone.

The optical assembly may be resiliently mounted along a single line transverse to the longitudinal or optical axis. In such a case a resilient ring may be used. Alternatively, the optical assembly may be resiliently mounted in the housing at a plurality of points along a line, the line transverse to the optical axis. In such a case resilient balls may be used. These mounting arrangements permit thermal expansion of the optical assembly which is not stressed by the housing.

The points or line of mounting may be on the spacer. The points or line may be half way along the length of the spacer. By positioning the mounting ring half way along the spacer, approximately equal expansion occurs in each direction along the optical axis which may have benefits in providing a symmetric loading.

The optical assembly may be mounted in the housing by a deformable ring between the housing and spacer, arranged such that it is around the circumference of the spacer. The optical assembly may be a monolithic piece of ceramic. The deformable ring may comprise a compression spring formed into a circle with an outer lining. The outer lining may be formed from a metallic sheet. The outer lining is preferably in contact with an inner surface of the housing and the circumference of the spacer to provide a seal between the housing and spacer. The seal is preferably hermetic or airtight.

The ring may have a C-shaped or O-shaped radial cross-section. In both cases the curved surface of the ring must contact the housing and spacer.

The ring is preferably in compression between the housing and optical assembly.

The ring may be brazed to the housing and/or spacer. The spacer may be alumina and the ring may be brazed to the alumina with a titanium activated braze material.

The sensor element may be a pill having an enclosed cavity.

The spacer and sensor element are preferably of the same material. The spacer and sensor element are of materials having substantially matching coefficients of thermal expansion (CTE).

The spacer may be a rod or tube. The sensor element is preferably sapphire. The spacer may be a sapphire rod, a sapphire tube, or an alumina tube. The spacer may be tapered at the sensor element end. A tube is preferable for the spacer as it avoids additional dielectric or refractive material in the optical path. The spacer provides a thermal shunt stopping the high temperatures at the sensor element from reaching the lens and fibre.

The housing may include a cap covering the sensor element and optionally part of the spacer. The cap may be adapted to be removable so as to expose the sensor element. The housing or cap may comprise a hole to admit gases from the environment being sensed.

The lens may be attached in a cylindrical recess in the spacer distal to the sensor element. The lens and optical fibre may comprise silica.

A cylindrical washer may be fitted in the cylindrical recess to centre the lens in the recess.

The lens may be a micromachined planar lens and may be attached to an end face of the spacer distal to the sensor element.

The cap may be bonded to the sensor element. The sensor element may include an enclosed cavity in a sapphire body, and the cap may comprise apertures for admitting gases from the environment being sensed.

The sensor element may include a membrane which deforms under changes in pressure, the cap having a hollow adjacent to the membrane so as to allow the membrane to flex.

The apertures are preferably radial to the optical axis.

The optical sensor may further comprise: collection optics arranged around the sensor element interrogation optical fibre adjacent to the spacer, the collection optics arranged to collect radiation from the environment of the sensor element and transmitted through the spacer, and to couple the radiation to a waveguide.

The waveguide may be one or more multimode optical fibres.

The collection optics may be formed of a half-torus which is arranged to couple the radiation to a bundle of multimode fibres. The collection optics and waveguide may be adapted to transmit UV radiation.

The present invention further provides an optical sensor comprising an optical assembly comprising a spacer and an optical waveguide, the spacer having a first end face which in use is subjected to a first temperature, and a second end face to which is coupled an optical waveguide, said optical waveguide configured for use up to a second temperature lower than the first temperature, the spacer providing a thermal gradient between the first end face and second end face when in use, wherein the optical waveguide is arranged to collect radiation from the environment of the first end face of the spacer which has been transmitted through the spacer to the second end face. The collection optics optically couple the radiation from the spacer into the waveguide. This allows remote detection of radiation collected in an extreme environment such as in a gas turbine combustion zone.

The present invention additionally provides an optical sensor array, comprising: an optical assembly comprising a plurality of sensor elements monolithically formed on a substrate, a spacer bar and an array of lenses, each sensor arranged along an optical axis with a respective lens, the spacer bar having a plurality of bores, each extending along an optical axis from a respective sensor element to a respective lens, the sensor elements spaced from the lenses by the spacer bar; and an array of optical fibres coupled to the optical subassembly for illuminating the sensor elements. This optical sensor array may provide a monolithic array of sensors which is simpler to manufacture than mounting a plurality of individual sensors described above.

The sensor elements may be adapted for use at a first temperature, the lenses and optical fibres may be configured for use up to a second temperature lower than the first temperature. The sensor elements may be spaced from the lenses and fibres by the spacer bar so as to provide a thermal gradient from the sensor elements to the lenses and fibres when in use.

The sensor element preferably comprises one or more Fabry-Perot cavities. The Fabry-Perot cavities may include an enclosed cavity with a membrane for detecting changes in pressure.

The present invention also provides a pressure and/or temperature monitoring system, comprising: the sensor or sensor array described above; and an interrogator having an interferometer for detecting changes in the dimensions of a cavity in the sensor element.

The present invention provides a method of assembling an optical sensor comprising an optical assembly resiliently mounted in a housing, the method comprising: fabricating a pill having an enclosed cavity; bonding the pill to a front end of a spacer; bonding a lens to the back end of the spacer to form the optical assembly; aligning an optical fibre to the optical assembly; and fixing the fibre in position by fusing the fibre to the lens. The method provides easier optical alignment with better temperature stability than the prior art.

The method may further comprise: before bonding the lens to the spacer inserting the spacer and sensor element into a first portion of the housing; and after fixing the fibre in position fitting a second portion of the housing over the lens, fibre and back end of the spacer.

The step of aligning the optical fibre to the optical assembly may comprise adjusting the position of the fibre to obtain maximum back-reflection from the pill.

The method may further comprise fitting a seal ring into a recess in the housing to resiliently mount the optical assembly in the housing when inserted in the housing. Alternatively, the resilient ring may be fitted around the spacer and then inserted in to the housing. The step of fitting a resilient seal ring around the spacer may comprise brazing the seal ring to the spacer.

The fibre is fixed in position by laser welding the fibre to the lens, using a plasma arc, or by glass frit to attach the fibre to the lens.

The present invention provides a method of manufacturing an optical sensor array, the method comprising: etching an array of recesses in a first slab; bonding a second slab to the etched substrate to form an array of enclosed cavities in a sensor body; bonding the sensor body to a front end of a spacer, the spacer having a plurality of bores, and aligning the bores with the enclosed cavities; and bonding a plurality of lenses to the back end of the spacer distal to the sensor elements to form an optical assembly.

The method may further comprise: after bonding the sensor body to the front end of the spacer inserting the sensor body and spacer into the front portion of the housing; after bonding the lenses to the spacer aligning an array of optical fibres to the optical assembly by adjusting the position of each fibre to obtain maximum back-reflection from the cavities; fixing the fibres in position by attachment the fibre to the lens; and fitting a second portion of the housing over the lens and fibre to complete the housing.

The present invention provides a sensor element, such as may be used in sensor described above, the sensor element comprising: a back plate slab; a front plate slab bonded to the back plate slab to form a sensor body, the back plate slab or front plate slab having a recess such that when bonded together a cavity is formed in the sensor body, the front plate having a membrane adapted to deform in response to changes in pressure; a cap bonded to the sensor body, the cap having a hollow adjacent to the membrane and one or more apertures extending from the hollow to an external surface of the cap. The hollow may be centrally located such that it is on the optical axis. The hollow allows the membrane to deform under pressure. The integral cap protects the sensor from extremes of temperature while permitting gas flow to exert the local pressure on a sensor membrane. Improved speed of response is also provided.

The sensor element may be larger than the membrane.

The cap is preferably of the same material as the front plate and back plate. The cap may be sapphire.

The cap may be the same thickness as the back plate or the sensor body. The cap and sensor body may be circular and have equal diameters.

BRIEF DESCRIPTION OF THE DRAWINGS

Embodiments of the present invention, along with aspects of the prior art, will now be described with reference to the accompanying drawings, of which.

DETAILED DESCRIPTION

Figure 3A:
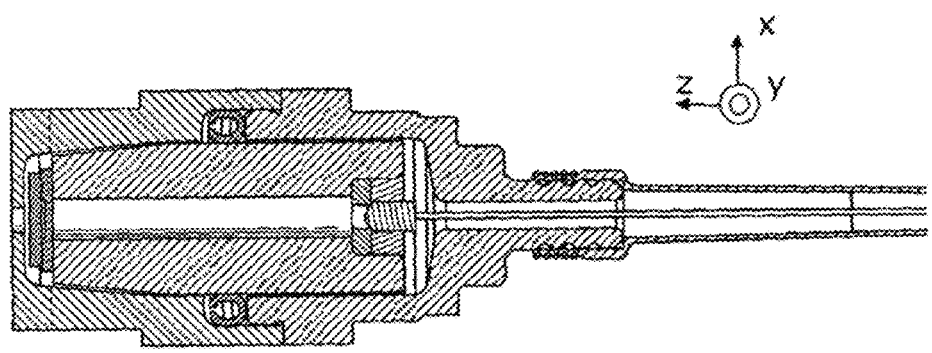
FIGS. 3A and 3B are diagrams of an optical sensor according to the present invention with component parts shown solid (FIG. 3A) and outline (FIG. 3B)
Figure 3B:
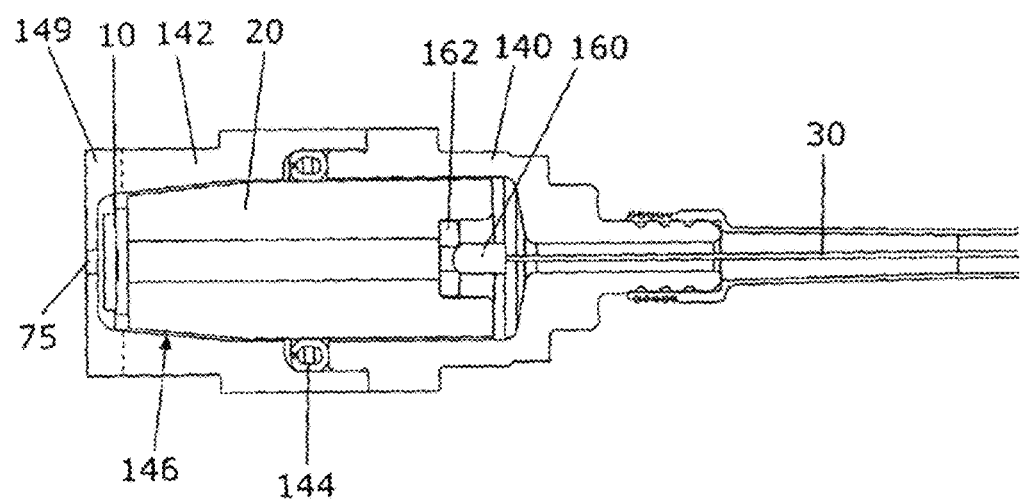
Figure 5:
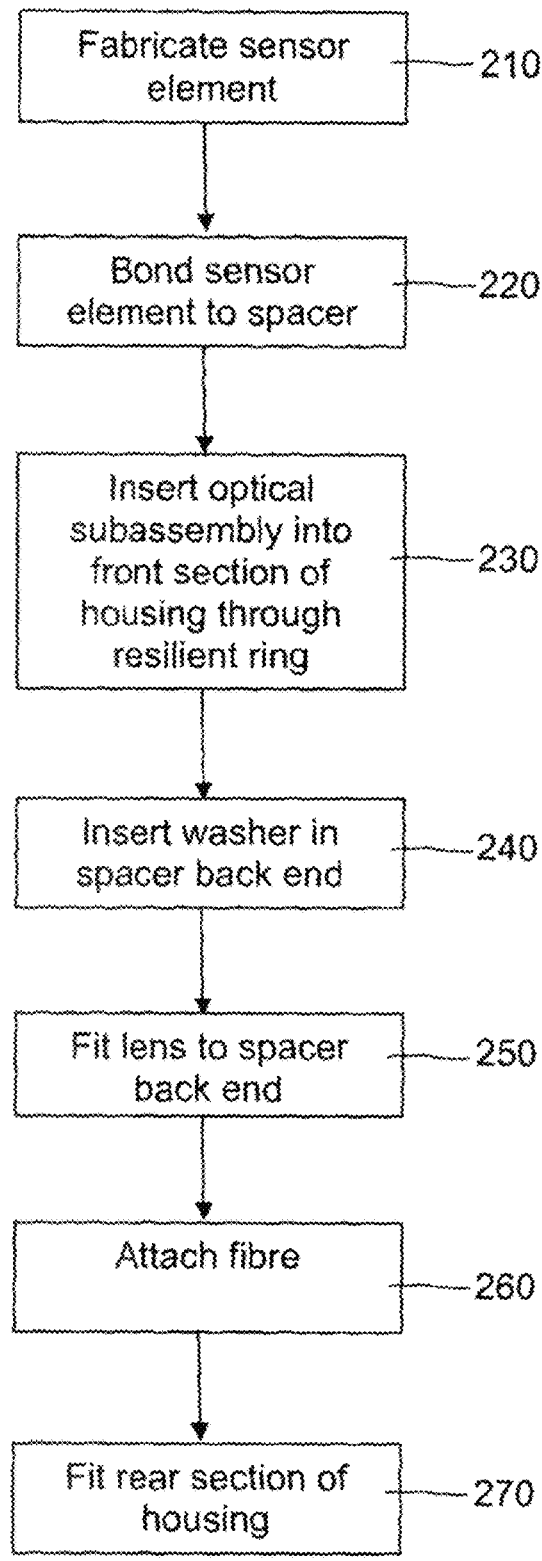
FIG. 5 is a flow chart showing method steps in manufacturing a sensor according to the present invention.

FIGS. 3A and 3B show a sensor according to an embodiment of the present invention. FIG. 3A shows the component parts as solid forms, whereas FIG. 3B shows the outline of the parts. FIGS. 3A and 3B are views of a cross-section through the central axis of the sensor. FIG. 5 is a flow chart showing the steps required to assemble the sensor.

The sensor of FIGS. 3A and 3B comprises a sensor element 10 comprised of two pieces of sapphire bonded together to form a "pill" structure. One of the pieces has a recess in the surface such that when bonded the other piece the pill has an enclosed cavity. The fabrication of the sensor element is indicated as step 210 in FIG. 5. The sensor element may be such as described above in reference to FIGS. 1 and 2. At step 220 the sensor element 10 is bonded to the front end of spacer 20 which as in FIGS. 1 and 2 may be a rod or tube, but is shown in FIGS. 3A and 3B as a tube. The spacer and sensor element are preferably the same material and that is preferably sapphire. The bond between sensor element 10 and spacer 20 may be formed by thermocompression, laser welding, laser assisted bonding or any other suitable technique. Thermocompression is the process of forming chemical bonds between surfaces by heating the surfaces and compressing them together. The processing temperature is below the melting point.

After the sensor element has been fitted to the spacer, the spacer and sensor element can be fitted into the housing.

The spacer 20 includes a tapered region which extends from the sensor element to about one third of the length of the spacer. The taper is optional but makes assembly of the sensor easier.

The housing comprises two portions. The first portion 142 forms the front of the sensor and fits over the sensor element 10 and part of the spacer. The second portion 140 forms the rear of the sensor and fits over the back end of the spacer, lens and fibre.

Before inserting the spacer and sensor element in the front portion 142 of the housing, the front portion is fitted with a resilient ring 144. The ring is placed in a recess in the front portion. One example of such a ring is the Helicoflex seal made by Garlock®. The resilient ring may consist of a compression spring formed in ring with an outer liner covering the spring to form a torus shape. The outer liner may be formed of a sheet wrapped around the coil. The outer liner may not meet at opposing edges thereby forming a C-shaped cross-section. The resilient ring must be a tight fit around the spacer and must have some compressibility. The spacer and sensor element are inserted into the front portion 142 of the housing through the ring until the spacer is at the required position. This occurs at step 230 in FIG. 5. The taper at the front of the spacer makes it easier to slide the spacer 20 into the resilient ring 144. The resilient ring 144 forms a tight fit inside and with the housing 142. Alternatively, the resilient ring may be first fitted onto the spacer by sliding it from the tapered end of the spacer to the required position. The spacer, sensor element and ring are then inserted into the housing until the resilient ring sits in a recess in the front portion of the housing.

Optionally, the resilient ring may be gold plated. This provides some plasticity and helps to provide a hermetic seal between the spacer and housing.

The front portion 142 of the housing includes a hole 75 in the end which allows gases from the environment to come in contact with the sensor element 10. The front portion 142 may include a removable cap 149 which includes hole 75 and extends approximately to the back plate of the sensor as shown by dotted lines in FIGS. 3A and 3B. The cap may extend more or less than this for example to reveal part of the spacer 20 or just the membrane of the sensor element 10. The cap 149 is also interchangeable with other caps having a different sized hole. This allows the user to set the amount of interaction the sensor element 10 has with the environment it is placed in. For example, changing the cap for one with a larger hole will increase the amount of gas flowing around the sensor element 10 and may improve the speed of response, that is improve the acoustic response.

At the back end of the spacer 20 is attached lens 160. In the present invention the lens 160 is attached to the spacer 20 such that the optical components: sensor element 10, spacer 20, and lens are arranged as a self-contained optical subassembly. This means the optical path from lens 160 to sensor element 10 is contained in a single ceramic assembly. The subassembly may be considered to be monolithic since it is formed, and functions optically, without requiring a mount etc. In the present invention the optical subassembly is coupled to the housing at only one point, or more preferably at one line around the spacer. The coupling is provided by the resilient mount, such as a deformable ring 144.

Figure 4A:
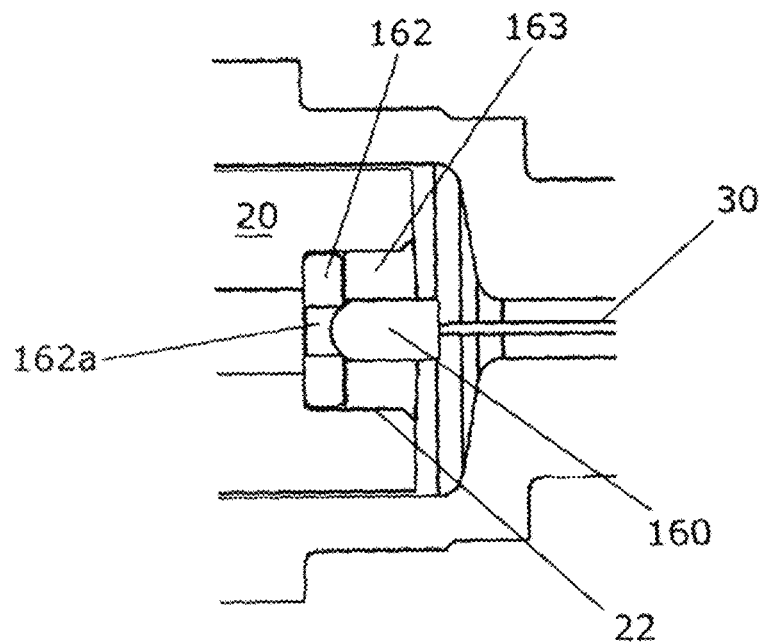
FIGS. 4A and 4B are diagrams of a lens mounted according to a first embodiment and second embodiment respectively.
Figure 4B:
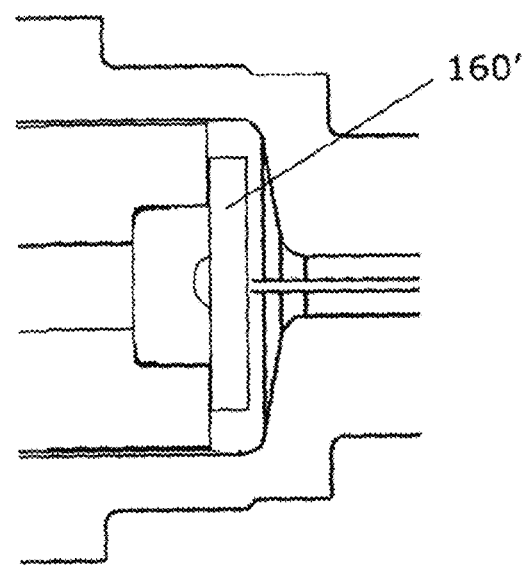

FIGS. 4A and 4B show two alternatives for how the lens is attached. In both cases the spacer 20 is shown as a tube with a hollow through the middle, but could instead be a solid rod. The diameter of the hollow is set such that the collimated beam provided from the lens can fit in the hollow and travel from the lens to the sensor. Alternatively if the rod is solid dielectric then the beam travels along and through the rod.

As shown in FIGS. 4A and 4B the spacer 20 includes a recess 22 for fitting the lens. FIG. 4A shows a washer 162 which is used to align lens 160 to the centre of the spacer 20. The washer has an outer diameter which is less than the diameter of recess 22 in the spacer and so allows the washer to fit in the recess 22. The washer fits up against the inner end wall of the recess. The washer has a hole 162a through the middle which is coaxial with its outer perimeter. The lens 60 has a curved surface which sits partly in the hole in the washer. The hole 162a may have a chamfer to allow the lens to seat in the hole. The lens 60 may be a rod lens. During assembly the washer 162 is inserted into the recess and bonded in the recess using glass frit or ceramic cement. This is indicated at step 240 in FIG. 5. The lens is then partly inserted into the hole 162a in the washer. The hole and curved surface of the lens will tend to centre the lens on the washer. The angular orientation of the lens is set by a reference. The reference defines a plane normal to the optical axis which pushes on the flat rear surface of the lens and thereby aligns the lens axis with optical axis. The reference may be a tooling component. The lens is held in place in the spacer with glass frit or ceramic cement. This step is shown as step 250 in FIG. 5. The bond between lens and spacer is shown as 163 in FIG. 4A but the thickness of the bond is greatly exaggerated. Any gap can be filled with frit or cement. Although the lens may be a different material to the spacer, such as silica, the thin layer of glass frit holding the lens in place is compliant enough to absorb any difference in expansion.

In alternative embodiments the washer may be left unbonded and is held in place by pressure from the lens which is itself bonded in position. In further alternative embodiments the washer is a push fit in the recess. Preferably the washer is the same material as the spacer, namely sapphire.

FIG. 4B shows an alternative lens 160' and attachment arrangement. In this case the lens is planar and may be of the type described in WO 2009/077727. Such a lens 160' may be manufactured from a glass or a silicon substrate by etching or micromachining. The lens 160' is attached to the back end of the spacer 20 using glass frit or ceramic cement. The curved surface of the lens is within the recess of the spacer. The recess required here may be smaller than that of FIG. 4A. The arrangement shown in FIG. 4B will require some alignment of the lens such that it is centred on the optical axis of the spacer and the recess in the spacer. Alternatively the outer diameter of the lens may be made the same as the outer diameter of the spacer 20 such that by aligning the outside of the spacer and lens the curved part of the lens is centred in the recess. In this embodiment no washer is required and so step 240 in FIG. 5 is omitted.

Light from the fibre is focussed by the lens to produce a beam waist at the sensor element or pill 10. The light reflected from the sensor element 10 travels through the spacer 20 and back to the lens to be focussed into the fibre 30. The distance between the lens and sensor element is set by the thermal gradient/temperature drop required in use. The fibre is a conventional silica single mode fibre and the lens may also be silica. The performance of the silica components degrades above about 600° C. and so if the sensor element is at 750° C. or 1000° C. the thermal gradient along the spacer must be sufficient that the silica components do not exceed 600° C. The environment in which the sensor is fitted will contribute to the thermal gradient. In gas turbines the temperature drops away rapidly from the combustion zone. The mounting arrangement and location of the sensor along with the density of gas flow around the sensor will provide contributions to how quickly the temperature along the spacer drops. Hence, different gas turbines or engines will require different spacer lengths. Nevertheless, a typical spacer length is 10-25 mm. The lens provides a beam diameter of around 500 µm. Highly accurate angular optical alignment is therefore required.

After the lens has been fitted, the optical fibre can be aligned and attached as indicated at step 260 in FIG. 5. Attachment of the optical fibre is the penultimate assembly step The fibre is preferably standard single mode optical fibre. The final position of the fibre is determined using a micromanipulator stage. Up until attachment of the fibre, the alignment of the sensor element and lens to the spacer has been achieved using standard machining tolerances and can avoid the need for precision machining or interference fit. The micromanipulator stage is used to adjust the position in x and y perpendicular to the optical axis, before moving the fibre 30 along the optical axis z closer to the lens. To determine the optimum position of the fibre active alignment is performed. The fibre is supplied with light, such as from a laser, which travels through the lens 160 or 160' and spacer 20 and is backreflected by the sensor element 10. The light then travels back through the spacer 20 and lens to the fibre. A splitter is used to direct the backreflected light to a detector. The position of the fibre is continually adjusted until a maximum backreflection is reached. When the maximum is achieved the fibre is fixed in position by fusing to the lens. In the prior art device the fibre alignment was performed using a gimbal mount to perform angular positional adjustment. The device now described uses lateral positional adjustment which is simpler than angular alignment. By laterally adjusting the position of the fibre the angular direction of the collimated beam from the lens is automatically achieved. Thus, the simpler lateral adjustment can achieve as good optical coupling as the prior art angular technique. The fibre is fused to the lens either by laser welding (for example using a CO2 laser) or by a plasma arc (such as is used to splice optical fibres together). If using laser welding multiple beams may be used to provide multiple bond sites that are equally spaced around the fibre. For example, four beams may be used. Immediately after fusing the weld sites will contract pulling the lens and fibre together. Since the lens and fibre are coaxial with the spacer, and the weld sites are equally spaced around the fibre, the forces will act symmetrically so no drift of alignment will occur during fusing. The prior art device fixed the fibre and lens assembly to the mount using welds to fix a ball in a socket. Since that alignment used angular positioning the ball would be likely to be at an angle and therefore axial asymmetry would be likely to cause drift as the welds cooled.

The final assembly step is to fit the back portion 140 of the housing. The back portion 140 is a tube of material such as Inconel. The tube has an inner end face such that the spacer 20 cannot pass through. Through the inner end face is a much smaller opening through which is fed the optical fibre 30 as the back portion is slid into position. The back portion 140 mates with the front portion 142. The mating surface may be provided with a screw thread. The two portions are preferably permanently attached together. For permanent attachment, the back portion 140 may be welded to the front portion 142 of the housing.

The sensor of the present invention is designed for use with the sensor element 10 at temperatures above 600° C. such as 750° C. or even 1000° C. such as are found in gas turbines and other engines. In such environments there may also be a high gas pressure and the presence of the sensor may provide an escape path for the high pressure gases. However, since such an escape path is usually a disadvantage, the sensor should be sealed to present such an escape path forming.

As described above in relation to FIGS. 3A and 3B, the lens 160, spacer 20 and sensor element 10 are mounted together to form an optical subassembly. This subassembly is coupled to the housing by resilient ring 144. The subassembly is not mechanically coupled to the housing at another point. Thus, the housing is able to distort or flex due to mechanical stress, shock, or thermal expansion (CTE) mismatch. Such distortion is not passed on to the optical subassembly. This in contrast to the prior art device described above in which slight mechanical distortion of the housing would cause optical misalignment due to slight movement of the ball and socket. In the device of FIGS. 3A and 3B the mechanical integrity of the sensor is provided by a housing 140, 142, but this is decoupled from the optical system.

The use of a resilient ring allows distortion or flexure of the housing without misaligning the optics. The manner in which the resilient ring 144 achieves this will now be described. However, we should also note that the resilient ring also provides a hermetic seal between spacer and housing such that gas cannot flow between the two and through the sensor. This prevents the sensor from forming a gas escape route or exhaust when fitted inside a gas turbine or other engine.

The embodiment of FIGS. 3A and 3B shows the optical subassembly coupled to the housing 140 at one point or line only on the spacer. The spacer is a cylindrical block or tube and the resilient ring is in contact with the spacer around its circumference. The line of contact is a circle and other than the width of the ring does not extend along the spacer. This means the spacer can expand and contract without being constrained or stressed by the housing. It is preferable that the housing is Inconel because it is able to withstand extremes of temperature and is commonly used in gas turbines. However, the coefficient of thermal expansion for Inconel is quite different to that of the sapphire of the spacer. Hence, if the spacer is bonded to the housing at two or more points along its length the spacer will experience stress due to the differing thermal expansions in the direction of the optical axis. This is especially important for the sensor of the present invention because in use it will see temperatures in the range 600-1000° C. so that the amount of expansion will be relatively large. The spacer will increase in diameter as it is heated and the resilient ring will thus be compressed by this expansion. However, the resilient ring is adapted to deform under compression and so will accommodate the expansion of the spacer without unduly stressing the spacer.

As mentioned above, the spacer may expand as it is heated. Thus, the length of the spacer will increase. However, since the light passing through the spacer is collimated, the small change in length will not significantly affect the optical coupling. The radius of the lens will also increase as it is heated, but this radial expansion is taken into account by limiting the diameter of the lens such that any expansion is taken up by the frit bonding the lens to the spacer.

As an alternative to using sapphire for the spacer, alumina could be used. Alumina has a similar coefficient of thermal expansion to sapphire and hence will be expansion matched to the sapphire sensor element. Alumina is also easier to machine and more able to withstand thermal shock than sapphire.

Figure 6:
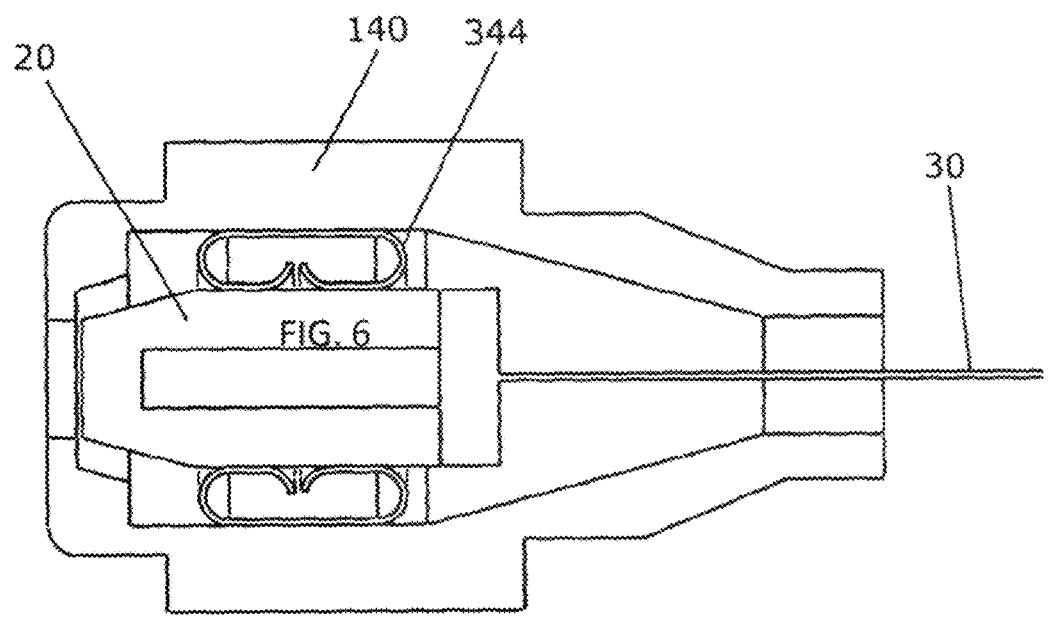
FIG. 6 is a schematic diagram of an optical sensor according to a further embodiment of the present invention.

Furthermore, alumina components can be joined to other components, especially metallic components by brazing. This results in an alternative embodiment to that shown in FIGS. 3A and 3B. The alternative embodiment is shown in FIG. 6. The embodiment shown in FIG. 6 differs from that in FIGS. 3A and 3B in that the resilient ring which may be a helicoflex seal, is replaced by a ring 244 having a C-shaped cross-section. The ring is brazed to the spacer which holds the ring in place and also seals it to the spacer. The C-shaped cross-section is also resilient and can flex to allow the housing to deform without damaging the optical coupling. The C-ring 244 may also be made smaller than the helicoflex seal to allow the size of the sensor to be reduced. The C-ring may also be brazed to the housing. The ring-to-housing braze uses a titanium activated braze material to bond to the housing which may be Inconel as mentioned above. By brazing the C-ring to both the housing and spacer a hermetic seal may be formed between the spacer and housing.

It is important that in use, in say a gas turbine, that should the sensor fail it makes its failure obvious rather than return ambiguous measurements. The most serious failure mode of the sensor is for the seal between the spacer and housing to fail and the sensor to become a leak path out of the engine, thereby seriously affecting the pressure measurement. Should this happen the most likely failure mode is that the spacer will be pushed back which will break the fibre. This will be seen as a dramatic change in back reflection and would be easily noticed by a user or alarm system in the interrogator. As an alternative, to check the sensor has not failed the pressure behind the spacer could be monitored. For example, a gas tight conduit from behind the spacer to the interrogator unit could be used to monitor sensor health.

Commonly the pressure or temperature in gas turbines is required to be monitored at more than a single position. It is useful to be able to monitor the pressure at various radii from the centre of the turbine. This may done using a rake having a plurality of sensors attached there to.

As mentioned above, the sensor element 10 shown in FIG. 2 comprises a back plate 16 which is bonded to disc 12 with a recess etched in one of its surfaces such that a hollow cavity is formed. The process of forming the sensor element begins by etching a recess in slab or wafer of sapphire. The recess may be etched preferably using chlorine-based chemistry, for example, using reactive ion etching. The recess provides a thinned part which acts as a membrane 13. Multiple recesses may be formed in a wafer which is then diced into individual discs. After forming the disc 12 with a recess, the back plate 16 is attached to the disc to form the pill structure. The thickness of membrane 13 may still be too thick for pressure sensing so the pill is thinned until the membrane is the required thickness. A typical membrane thickness is around 100 µm although the thickness required for high responsivity will also be determined by the diameter of the recess. The unthinned side of the sensor element is the backplate.

Figure 7:
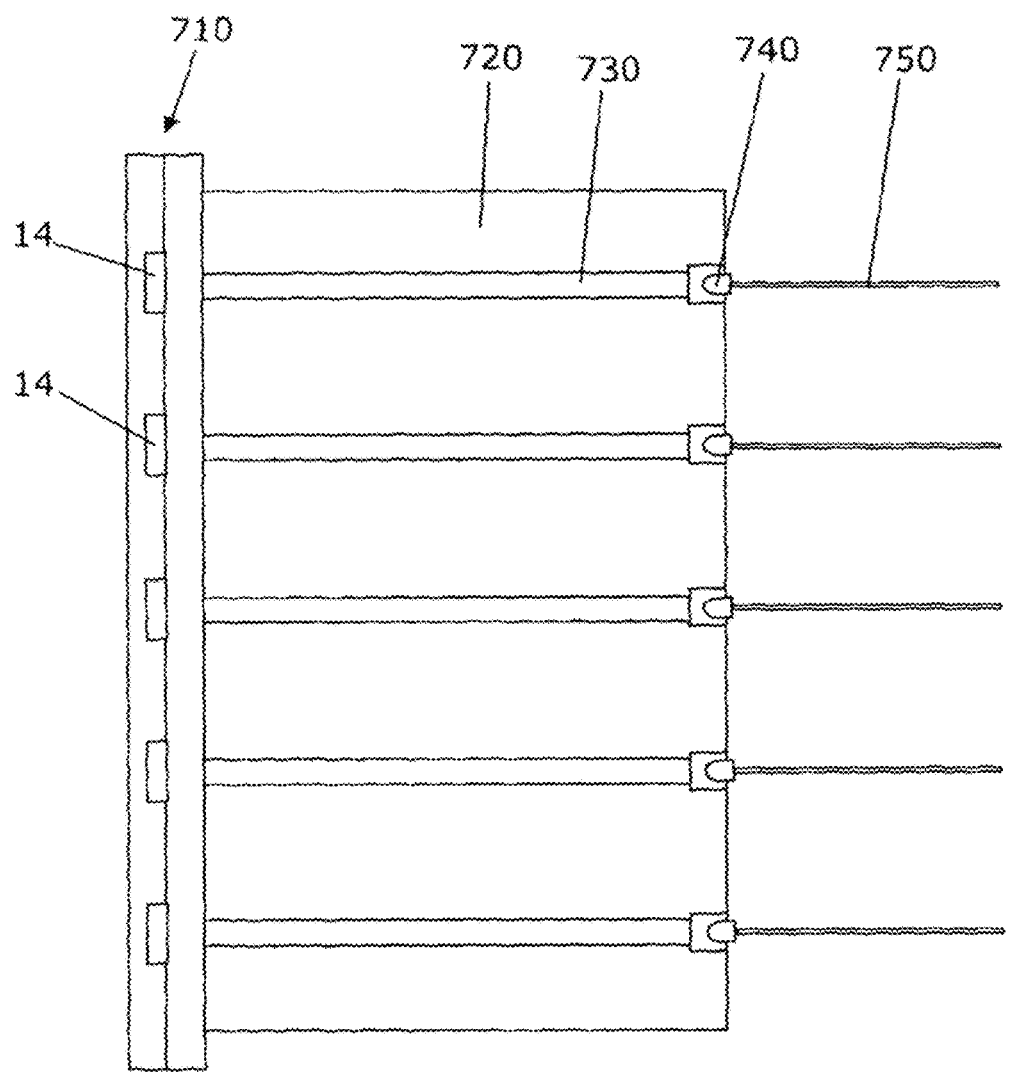
FIG. 7 is a schematic diagram of an array of optical sensors according to the present invention.

To produce an array of a plurality of sensors for use in a rake of a turbine, the wafer is etched to have a plurality of recesses as described above. However, instead of dicing the wafer into discs, the wafer is diced into strips each having a linear array of recesses. The backplate of the array may be attached after dicing into strips and the strips may be thinned to an appropriate membrane thickness. An array of spacers such as sapphire rods or tubes may be attached to the strip, or as shown in FIG. 7 a bar 720 may be attached to the linear array 710 having a plurality of recesses. The bar may be solid or include a plurality of bores 730 which are aligned with the recesses 14. Lenses 740 and fibres 750 may be attached using the methods described above. The fibres may form a fibre array. The spacing of the recesses may be set to conform with a minimum achievable spacing of the lenses or fibres, or alternatively may be set by the sensing requirements. The sensor array may be fitted to a housing using similar methods to those described above, namely using a resilient ring surrounding the sensor array. In such a case the edges of the bar should be curved to fit the ring.

The arrays of sensor may also be formed as a 2-D matrix instead of a linear array but using the techniques described herein.

Figure 1:
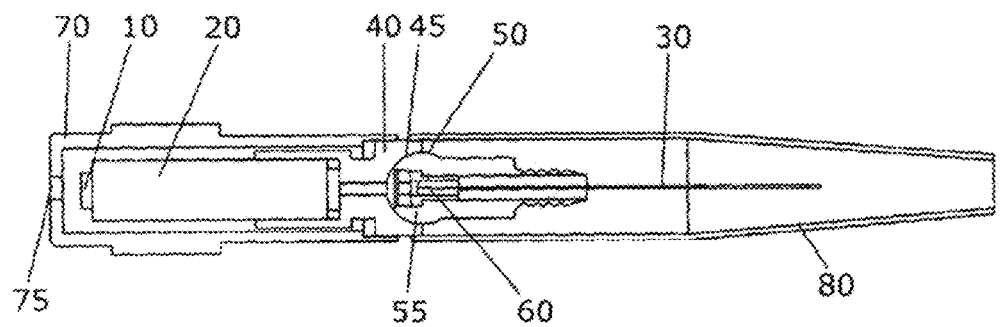
FIG. 1 is a schematic diagram of an optical pressure and/or temperature sensor according to the prior art.
Figure 2:
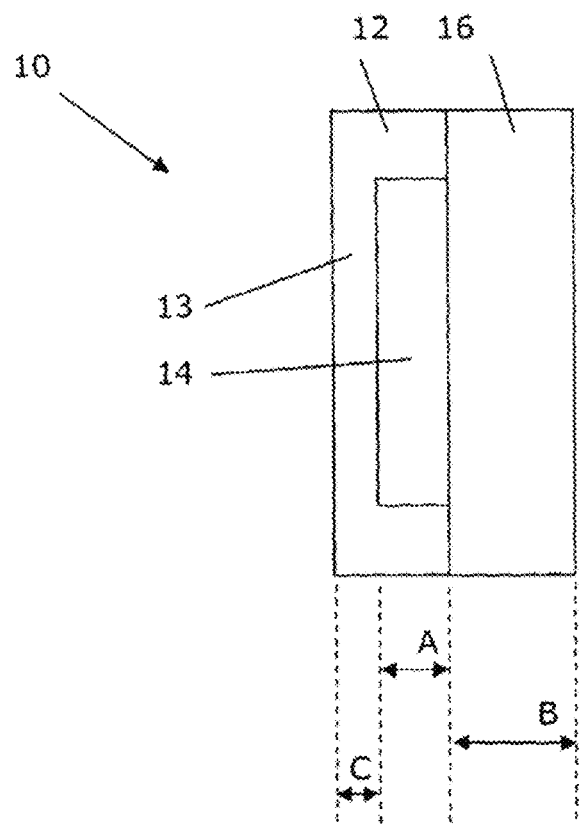
FIG. 2 is a schematic diagram of a sensor body with one or more Fabry-Perot cavities.

Another advantage of the present invention in comparison to prior art devices such as FIG. 1 is that the optical system and housing at the back end of the spacer are less spatially constrained and allow other functionality and sensing to be added. The device of WO 2009/077727 requires the use of a gimbal to align the fibre-lens assembly in the ball and socket arrangement. This prevents additional optics from being added at the back of the spacer. When sensing in turbines it would be useful to be able to determine if flame-out has occurred, that is, determine if the flame in the combustion chamber has been extinguished.

Previously expensive Geiger-Muller tubes have been incorporated into gas turbine engines. Recent advances have resulted in less expensive silicon carbide sensors being adopted. Such sensors are sensitive to the long wavelength UV that is present in the combustion chamber as long as there is a flame. Nevertheless, such sensors are required to be fitted in the combustion chamber or close thereto and require 24V power to be supplied. The sensors include a silicon carbide photodiode which is not able to withstand the full temperature range experienced in the turbine. For example, a maximum temperature the SiC sensor may withstand may be around 235° C. This means the sensor will be fitted a distance from the combustion chamber but where it is still able to view the UV. In some cases, the sensor will need to be water or air cooled. Electromagnetic interference (EMI) near the engine also affects such electronic sensors and results in the need for a head amplifier near to the engine. Thus it is desirable to be able to provide a flame-out sensor that can withstand a greater range of temperatures than a silicon carbide based sensor. It is also desirable to provide a sensor that does not require power to be supplied into, or close to, the combustion chamber.

The sensors of the present invention described above, which include spacer such as a sapphire rod or tube may be adapted to allow radiation to be collected from a gas turbine engine. The peak of the flame emission occurs at around 320 nm. The sapphire rod or tube can collect this radiation at its front end and guide it to the back end where it is coupled into a multimode fibre and conducted away for sensing away from the engine, such as at the interrogator. Details of the interrogator are provided at the end of the detailed description.

Figure 8A:
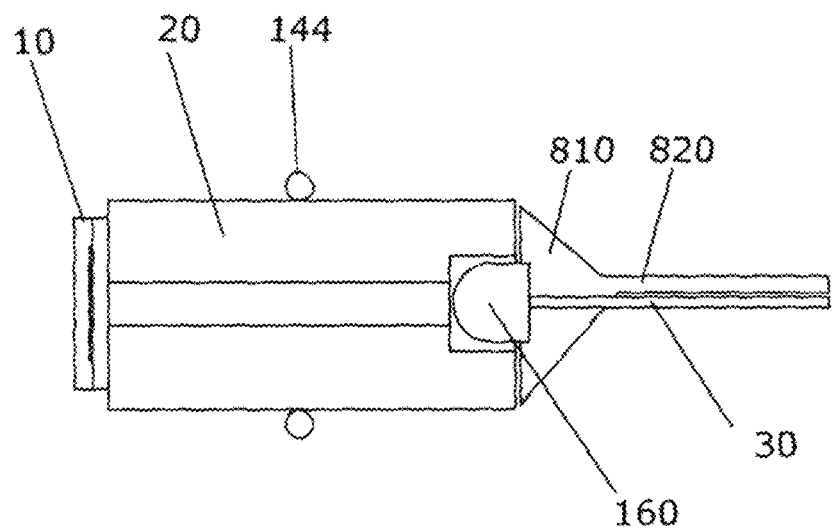
FIGS. 8A, 8B, and 8C are three embodiments of an optical sensor adapted to collect radiation in an engine.
Figure 8B:
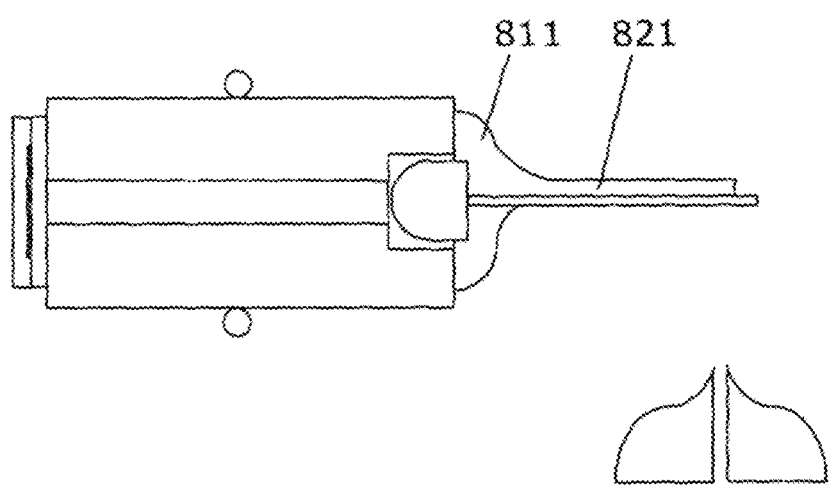
Figure 8C:
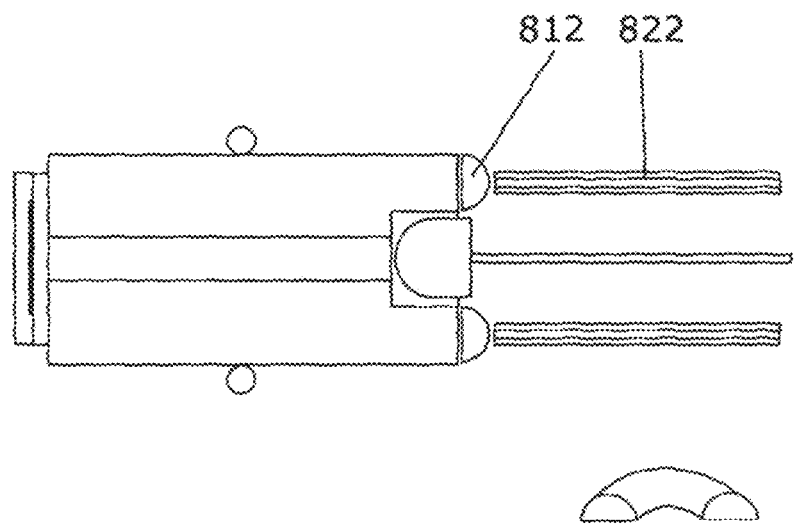

FIGS. 8A, 8B, and 8C show sensors based on the sensor of FIGS. 3A and 3B, but with additional collection optics at the back end of the spacer.

FIG. 8A shows the back end of the spacer 20, lens 160 and single mode fibre 30 with a taper 810 and multimode fibre 820 added. The taper 810 collects light from the sapphire tube spacer and couples it to the multimode fibre. The taper only needs to be loosely coupled to the spacer to achieve a better than 10% collection efficiency. Due to the lower temperatures (maximum of 700° C.) experienced at the back of the spacer, the taper may be silicon or sapphire and is preferably bonded to the sapphire tube with glass frit. The taper is shaped to conduct the light to the multimode fibre. Alternatively, the multimode fibre may be replaced by a bundle of multimode fibres distributed around the central sensor fibre 30. To achieve the required coupling efficiency the taper may have a length of 25-30 mm, this also allows the taper to compatibly couple with the multimode fibre which typically has a numerical aperture (NA) of 0.275. These values assume the sapphire tube spacer has a 10 mm outer diameter, but typically the diameter will be 5-8 mm so smaller tapers may be used.

The far end of the multimode fibre is away from the engine and away from the extreme temperatures. Therefore a conventional photodetector may be used and conveniently can be located and powered in the interrogator. Such a photodetector may be a conventional silicon PIN or APD photodiode. Filtering of the light received may be required to eliminate other wavelengths such as infra-red or to tailor the photodetector response. In the present embodiments low-cost filters may be used because of the low temperature environment.

FIGS. 8B and 8C show alternative coupling and taper arrangements to FIG. 8A. FIG. 8B shows a taper 811 which couples to a single multimode (MM) fibre 821. Unlike FIG. 8A the taper 811 is not conical or triangular but curves to a central point for coupling to the MM fibre. The interrogator fibre 30 is aligned side-by side with the MM fibre as the fibres extend away from the sensor. The MM fibre and interrogator fibre 30 ideally are both located on the central axis but this is not possible. One of the fibres therefore has to be offset from the central axis. Preferably the MM fibre is offset. This requires a consequential offset to the centre of the taper such that the apex to which the MM fibre couple is not central.

FIG. 8C shows another alternative embodiment. This embodiment uses a bundle of multimode fibres 822 and a taper 812 having a semi-circular cross-section. The taper forms a ring around the central interrogator fibre 30 such that the taper is approximately a half-torus shape. The circular cross-section couples and focuses the collected UV light to the fibre bundle 822 which is spaced apart from the central fibre.

Figure 9A:
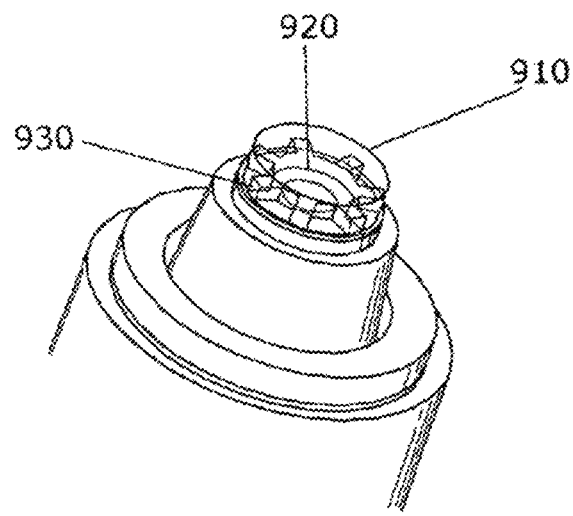
FIGS. 9A, 9B, and 9C show an optical sensor according to the present invention with an integral cap bonded to the sensor element and two views of the cap itself.
Figure 9B:
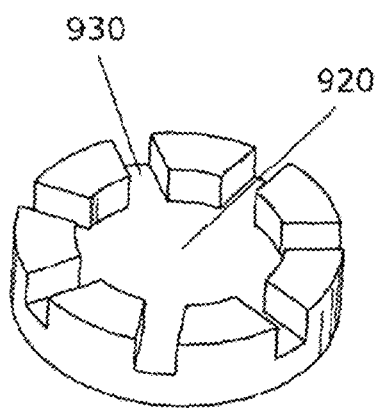
Figure 9C:
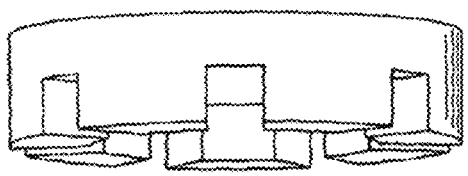

FIG. 9A shows a further embodiment of the present invention comprising a cap 910 bonded to the sensor element. FIG. 9B shows the cap on its own with the underside uppermost, that is, the side which is bonded to sensor element is uppermost. The cap 910 is adapted to reduce mass flow in the region of the membrane of the sensor. Reduced mass flow reduces large temperature swings which may affect the sensor's ability to continuously and quickly respond to pressure changes.

The cap 910 replaces the metal cap 149 which is part of the front portion 142 of the housing such as shown in FIGS. 3A and 3B. The cap 910 is bonded directly to the sensor body. As described above with reference to FIG. 2 the sensor body 10 has a front plate 12 and back plate 16 bonded together. The front plate 12 has a recess 14 etched in one of the planar surfaces such that when bonded to the back plate a cavity is formed in the sensor body. Front plate and back plate are preferably discs. They are bonded together using thermocompression bonding or using glass frit. The front plate is thinned to form a membrane 13. The membrane deflects in response to changes in pressure changing the thickness of the enclosed cavity. The membrane is preferably circular as are the front and back plates. The cap 910 is also circular and preferably of the same diameter as the front and back plate. The cap includes a hollow 920 adjacent to the membrane such that deflection of the membrane is not hindered by the cap. Preferably, the hollow 920 is circular with a diameter at least as large as the membrane 13. The cap also has apertures 930 extending from the hollow 920 to the outer curved surface of the cap. The apertures allow the membrane to be subjected to the pressures of the surrounding environment and thereby measure the pressure. The apertures may be evenly spaced around the circumference of the cap, or set at irregular spacings. The apertures may be tapered or curved. FIG. 9A shows seven apertures although other numbers and arrangements of apertures are possible, including apertures in the end face of the cap.

The cap 910 is preferably of the same material as the sensor body 10, and that is preferably sapphire. The spacer 20 is also preferably sapphire. The cap of FIG. 9A is made by etching a recess and channels in a sapphire disc. When bonded to the sensor body, the channels form the apertures 930 and the recess forms the hollow 920.

The advantage of using a cap bonded to the sensor body is that compared to the cap of FIGS. 3A and 3B, the acoustic path length to the sensor membrane is shorter. This provides a better frequency response such that it is able to respond to pressure changes more quickly and is less likely to resonate at frequencies of interest. If the cap is also made of sapphire it is unlikely to erode as can happen with metal caps. The cap also protects the membrane from erosion. A further advantage is that the hollow 920 inside the cap provides a consistent environment for the sensor membrane. This produces more consistent results and requires less calibration. The cap may be a similar thickness to the back plate 16 or sensor body 10 as a whole. This provides a largely symmetric sensor because the thin membrane is sandwiched between two thick layers of sapphire. Therefore asymmetric stressing of the sensor may be reduced.

The apertures are preferably large enough that they do not become blocked by particles. Preferably the apertures are around 100 µm in width.

Figure 10:
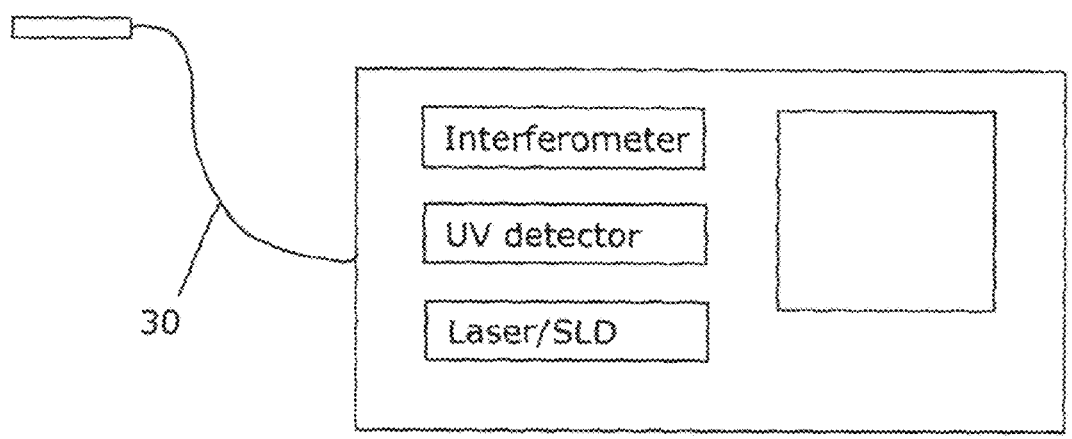
FIG. 10 shows a pressure and/or temperature monitoring system comprising the optical sensor of the present invention.

The optical sensor according to the present invention may be interrogated using interrogator shown in FIG. 10. The interrogator comprises a light source such as a laser or superluminescent diode (SLD). The light emitted from the light source is coupled to the optical fibre 30 and transmitted to sensor element 10. Light is reflected back from the one or more Fabry-Perot cavities of the sensor body and transmitted back along fibre 30 to the interferometer. Interference fringes are detected at the interferometer. Optionally, if the sensor is adapted to collect electromagnetic radiation, such as UV, from the environment of the sensor element, then the interrogator may also include a photodetector as discussed above.

As the pressure or temperature in the environment of the sensor element 10 changes, the dimensions of the sensor element will change. Changes in pressure will cause the membrane 13 to deflect changing the distance "A" (see FIG. 2). Changes in this dimension will causes a change in the phase relation of light travelling toward the membrane and that travelling away from the membrane. Interference fringes at the interrogator will change as the cavity length changes. Temperature changes will also cause the length "B" to change.

With a fixed wavelength light source, changes in the length of the optical cavities may be measured by correlating the intensity of the detected light with a particular portion (from maximum to minimum) of an interference fringe (assuming that the change in length resulted in a change due to less than one fringe). As the length in a particular optical cavity changes a sinusoidal variation in intensity will be measured at the photodetector, assuming no optical losses occur. For instance, a lookup table of intensities may be generated against cavity length in order to generate the required correlation so the measured intensity relates to one particular cavity length.

Alternatively, the light source may be a laser which is coupled to a Mach Zehnder interferometer. The laser provides a coherent light source of stable intensity. The Mach-Zehnder is arranged to phase or amplitude modulate the laser light in a prescribed manner. The modulated light is back reflected by cavity surfaces and interfered with the light transmitted to the fibre. Changes in the interference fringes at the detector will relate to changes in the dimensions of the cavities as a result of changes in pressure and/or temperature. The magnitude of these dimensional changes allows the pressure or temperature at the sensor element to be determined.

A description of interrogation systems are also described in WO 2009/077727.

The person skilled in the art will readily appreciate that various modifications and alterations may be made to the above described optical sensor, method of manufacturing the optical sensor, sensor array, and cap for the sensor element without departing from the scope of the appended claims. For example, different shapes, materials and dimensions may be used.

What is claimed:

1. A method of assembling an optical sensor comprising an optical assembly, the method comprising:
    fabricating a sensor element formed of a pill having an enclosed cavity;
    bonding the pill to a front end of a spacer;
    bonding a lens to a back end of the spacer to form the optical assembly, the optical assembly comprising the sensor element, spacer and lens; and
    after said bonding of the lens to the back end of the spacer:
        aligning an optical fibre to the optical assembly; and
        fixing the optical fibre in position by fusing the fibre to the lens.

2. The method of claim 1, wherein the sensor element, spacer and lens are aligned along an optical axis, and the step of aligning the optical fibre to the optical assembly comprises aligning the optical fibre to illuminate the sensor element.

3. The method of claim 1, wherein the fibre is fused to the lens by laser welding the fibre to the lens.

4. The method of claim 1, wherein the fibre is fused to the lens by using a plasma arc to attach the fibre to the lens.

5. The method of claim 1, wherein the fibre is fused to the lens by glass frit to attach the fibre to the lens.

6. The method of claim 1, wherein the step of aligning the optical fibre comprises adjusting the position of the fibre to obtain back-reflection from the pill.

7. The method of claim 1, wherein the spacer and sensor element are of the same material.

8. The method of claim 1, wherein the spacer and sensor element are of materials having substantially matching coefficients of thermal expansion (CTE).

9. The method of claim 1, wherein the lens is attached in a cylindrical recess in the spacer distal to the sensor element.

10. The method of claim 9, further comprising fitting a cylindrical washer in the cylindrical recess to centre the lens in the recess.

11. The method of claim 1, wherein the spacer is a rod or tube.

12. The method of claim 1, further comprising mounting the optical assembly in a housing to provide mechanical protection to the optical assembly.

13. The method of claim 12, further comprising inserting the spacer and sensor element into a first portion of the housing.

14. The method of claim 13, further comprising fitting a second portion of the housing over the lens and fibre.

* * * * *